United States Patent
Ali et al.

(10) Patent No.: US 8,425,731 B2
(45) Date of Patent: Apr. 23, 2013

(54) PYROLYSIS PROCESS FOR DECOMPOSING RUBBER PRODUCTS

(75) Inventors: Mazlan Ali, Taman Setiawangsa (MY); Siti Fatimah Mohd Shariff, Taman Setiawangsa (MY); Christopher John Webb, Newbury (GB)

(73) Assignee: Advanced Pyrotech SDN. BHD., Kuala Lumpur (MY)

( * ) Notice: Subject to any disclaimer, the term of this patent is extended or adjusted under 35 U.S.C. 154(b) by 0 days.

(21) Appl. No.: 13/382,889

(22) PCT Filed: Jul. 15, 2010

(86) PCT No.: PCT/MY2010/000123
§ 371 (c)(1),
(2), (4) Date: Jan. 18, 2012

(87) PCT Pub. No.: WO2011/008075
PCT Pub. Date: Jan. 20, 2011

(65) Prior Publication Data
US 2012/0103780 A1    May 3, 2012

(30) Foreign Application Priority Data
Jul. 17, 2009  (MY) .................. PI20093010

(51) Int. Cl.
*C10B 53/08* (2006.01)
*C07C 1/40* (2006.01)
*C10G 1/00* (2006.01)

(52) U.S. Cl.
USPC ........ 201/8; 201/15; 201/25; 201/30; 201/35; 585/241

(58) Field of Classification Search ................ 201/8, 15, 201/25, 30, 35; 585/241
See application file for complete search history.

(56) References Cited

U.S. PATENT DOCUMENTS

| | | | | |
|---|---|---|---|---|
| 4,284,616 A * | 8/1981 | Solbakken et al. | ........ | 423/449.7 |
| 4,839,151 A * | 6/1989 | Apffel | ........ | 423/449.7 |
| 4,983,278 A * | 1/1991 | Cha et al. | ........ | 208/407 |
| 5,057,189 A | 10/1991 | Apffel | | |
| 5,167,772 A | 12/1992 | Parker, Sr. | | |
| 5,437,237 A * | 8/1995 | Digre | ........ | 110/346 |
| 5,894,012 A * | 4/1999 | Denison | ........ | 422/150 |
| 6,221,329 B1* | 4/2001 | Faulkner et al. | ........ | 423/445 R |
| 6,271,427 B1 | 8/2001 | Ershag | | |
| 6,657,095 B1 | 12/2003 | Holden et al. | | |
| 6,736,940 B2* | 5/2004 | Masemore et al. | ........ | 201/25 |
| 7,264,694 B2* | 9/2007 | Merrell et al. | ........ | 202/105 |
| 7,416,641 B2* | 8/2008 | Denison | ........ | 202/99 |
| 7,959,890 B2* | 6/2011 | MacIntosh et al. | ........ | 423/449.7 |
| 2008/0128259 A1* | 6/2008 | Kostek et al. | ........ | 201/4 |

* cited by examiner

*Primary Examiner* — Nina Bhat
(74) *Attorney, Agent, or Firm* — Maschoff Brennan

(57) ABSTRACT

A carbonization process of rubber products, such as shredded waste tires, in a sealed carbonizing vessel whose operating pressure is below atmospheric pressure and under controlled high temperature environment while continuously being moved in a defined path at a controlled speed thus enabling the shredded tires to be fed constantly into the vessel while the by-products of the carbonization process are continually discharged.

9 Claims, 1 Drawing Sheet

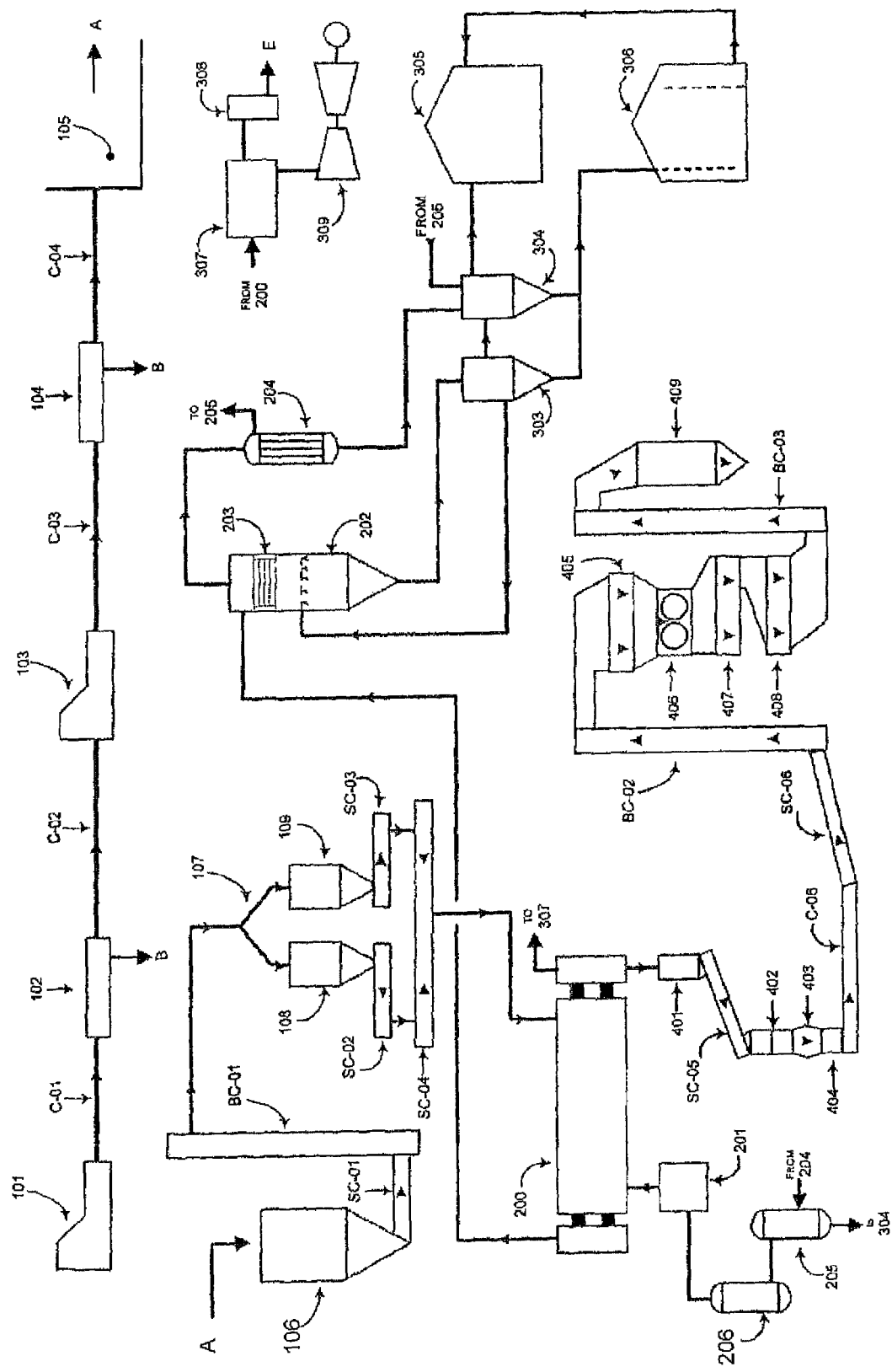

PYROLYSIS PROCESS FOR DECOMPOSING RUBBER PRODUCTS

FIELD OF INVENTION

The present invention relates to a pyrolysis process for decomposing rubber products.

BACKGROUND OF INVENTION

Rubber products such as used tyres and the like have and will continue to become a waste hazard that cannot be combusted entirely not without extensive flue gas treatment due to the generation of noxious gases e.g. hydrogen sulfide.

The most preferred and known method of destroying rubber products has been by shredding rubber products and turning them into surface materials and even this method has proven unsuccessful especially for heavy use surfaces and consequently the market demand in this area has depleted. As such rubber products are therefore still mainly being stocked at dedicated sites waiting for a technology that can re-cycle them in an environmentally and commercially acceptable way.

Among many other methods in use today, a common method or system known as pyrolysis is used that it is only able to process the shredded products in batches due to its very limited operating capacity in that it's too time consuming especially during loading and unloading of the shredded products into and from this system.

Therefore there is a demand for a system which is able to destroy rubber products more effectively and efficiently as such the volume of rubber products is rising at an alarming rate.

SUMMARY OF INVENTION

Accordingly, the present invention provides a pyrolysis process for decomposing rubber products, the process includes the steps of (a) shredding the rubber products, (b) extracting first by-product by at least one magnetic separator and discharging said first by-product for recycling, (c) feeding said shredded products into a carbonizing vessel to decompose said rubber products, (d) drawing out second by-product and third by-product from said carbonizing vessel into a quench vessel to reduce the temperature and further into a condenser where said second by-product which is cooled and condensed flows into a storage tank, cooled an un-condensable third by-product flows to a gas holder to be distributed as fuel for a fuel burner for said carbonizing vessel, and fourth by-product exits the carbonizing vessel passing through a steam generator as an auxiliary burner to maintain generation of steam to drive power generator that provides electrical power to recycling process said fourth by-product further enters scrubbing system and discharged to the atmosphere thereafter, (e) cooling fifth by-product and residual first by-product exiting from the carbonizing vessel into a first cooling chamber to reduce temperature, (f) extracting residual first by-product by at least one magnetic separator and subsequently discharged for recycling and (g) discharging cooled fifth by-product to a sieve for separating and grading into different particle sizes and further transferring said cooled fifth by-product into a storage silo for packaging and shipment.

The present invention consists of several novel features and a combination of parts hereinafter fully described and illustrated in the accompanying description and drawing, it being understood that various changes in the details may be made without departing from the scope of the invention or sacrificing any of the advantages of the present invention.

BRIEF DESCRIPTION OF THE DRAWING

The embodiment of the invention will now describe, by way of example only, with reference to the accompanying figure in which:

FIG. 1 illustrates the process flow of a process for decomposing rubber products according to the preferred embodiment of the present invention.

DETAILED DESCRIPTION OF THE PREFERRED EMBODIMENTS

The present invention relates to a pyrolysis process for decomposing rubber products. Hereinafter, this specification will describe the present invention according to the preferred embodiments of the present invention. However, it is to be understood that limiting the description to the preferred embodiments of the invention is merely to facilitate discussion of the present invention and it is envisioned that those skilled in the art may devise various modifications and equivalents without departing from the scope of the appended claims.

Although the description hereinafter refers to used rubber products such as rubber tyres and the like, it is understood that the invention can be used to decompose unused rubber products such as used rubber tyres or unused rubber products such as unused rubber tyres with defects, or a combination of both.

For a better understanding of the invention, FIG. 1 relates to a recycling process or carbonization process of used rubber product such as shredded waste tyre chips and the like in a vacuum sealed carbonizing vessel (200) or pyrolysis reactor vessel, whose operating pressure is maintained below atmospheric pressure where the shredded tyre chips are subjected to a controlled high temperature environment while continuously being moved in a defined path at a controlled speed thus enabling shredded tyre chips to be fed constantly into the vessel (200) while the resultant products or by-products of the carbonization process are continually discharged.

Whole used or waste tyres are delivered to the carbonizing vessel (200) after being de-beaded into a first stage coarse shredder (101) which size reduces the tyres to large particle sizes of no pre-determined dimension. A portion of steel wire such as loose steel wire, referred to as first by-product, contained in the tyres is extracted during the coarse shredding process and is discharged from the shredder (101) via a conveyor (C-01) on to a vibrating magnetic separator (102), is captured by the magnetic separator (102) while the remaining shredder particles are conveyed via a conveyor (C-02) to a second size reducing shredder (103) which reduces the large tyre particles to approximately 10 mm uniform size. Resulting from the uniform size reduction the majority of the remaining steel wire in the shredded tyre particles is extracted and following the uniform tyre shredder (103) the uniform tyre particles are conveyed via a conveyor (C-03) to a second magnetic separator (104) which extracts the loose steel wire from uniformly shredded tyre particles and together with the loose steel wire from magnetic separator (102) is conveyor (B) to a storage area as re-cycle steel. The uniformly shredded tyres are conveyed by a conveyor (C-04) to a central collection area (105) from where they are conveyed by a conveyor (A) to a weighing feed hopper (106).

The uniformly shredded tyre particles are deposited by gravity from the weighing feed hopper (106) into a screw conveyor (SC-01) which feeds an elevating bucket conveyor (BC-01). The elevating bucket conveyor (BC-01) lifts the shredded tyre particles up to a predetermined height and deposits the particles into a bi-directional gravity feed duct (107) which evenly distributes the shredded tyre particles into two particle silos (108) and (109). By automatic control the shredded tyre particles are fed into individual screw conveyors (SC-02 or SC-03) and by automatic mass flow control the screw conveyors (SC-02 or SC-03) feed a bi-directional screw conveyor (SC-04) which feed shredded tyre particles into the waste tyre carbonizing reactor (200).

The thermal energy for the carbonizing reactor (200) is provided from the flue gas, referred as fourth by-product, of a dual burner (201) which receives its fuel from an external fuel supply or, from syngas, referred as third by-product, that is extracted from the waste tyre fed into the process for carbonizing. The duel fuel burner (201) is controlled to provide a pre-determined flue gas temperature to the carbonizing reactor (200) which can be modulated to provide the required temperature according to flow by weight of the waste tyre particles as fed to the carbonizing reactor (200).

The waste tyre particles fed into carbonizing reactor (200) are conveyed through the reactor by a continuously rotating drag chain conveyor that travels bi-directionally in a continuously loop in transfer cylinders that operate in a partial vacuum i.e. oxygen is below its stoichiometric level to prevent combustion. As the waste tyre chemically decomposes through a pyrolysis process (carbonizing) inside the reactor (200) oil vapour, referred as second by-product, and a synthesis gas (syngas) are recovered from the waste tyre particles while the waste tyre is conveyed through the first transfer cylinder leaving small a quantity of partially decomposed waste tyre, carbon black, referred as fifth by-product and the remaining steel wire to be transferred through the second transfer cylinder. As the remaining small quantity of waste tyre is conveyed through the second transfer cylinder it decomposes into carbon black completing the carbonization process.

The oil vapour and syngas are drawn out of the reactor (200) by pressure differential and enters a quench (202) where the temperature of the oil vapour and syngas is reduced from at least 450° C. to at least 90° C. The quench process is achieved through a sealed recycled cooling water heat-exchanger (203) located in the quench vessel (202). In addition to heat-exchanger (203), a defined quantity of recycled oil extracted from the waste tyre is also used for quenching thus ensuring there is no saturation of the oil vapour by a dissimilar fluid during the quenching process thereby avoiding the need for downstream treatment. The syngas temperature is reduced in the quench in the same way thereto avoiding contamination of the syngas by the quench fluid.

The cooled oil vapour and syngas exits from the quench vessel (202) and pass through a water cooler condenser (204) the oil vapour condenses to a liquid and flows to oil storage tank (304).

The cooled syngas, which is non-condensable, exits the condenser (C) and passes through a syngas suction knock-out drum (205) where any entrained oil is removed and returned to oil storage tank (304). The syngas is delivered to a gas holder (206) for ultimate delivery as fuel to be burnt in the dual fuel burner (201).

A portion of the oil vapour condenses in the quench fluid stream and together with the quench fluid is returned to bottom oil tank (303) which is hydraulically balanced with bottom oil tank (304) the returned fluid being greater in volume than the fluid used for quenching has the excess siphoned off and delivered to the main oil transfer tank (305), while at the same time oil is continually drawn off from bottom oil tank (304) for use as the quench fluid. In the event particulate matter from the decomposition of waste tyre becomes entrained in the oil returned to either bottom oil tank (303) and (304) respectively, the particulates will fall to the bottom of these oil tanks. The oil contaminated by particulate carryover is drawn out from the lower region of the bottom oil tanks (303 and 304) and delivered to a main bottom oil storage tank (306) where it is allowed to settle thus providing time for particulates fall out of solution. The bottom oil storage tank is periodically tested and particulate free oil drawn off via a weir and delivered to the main oil storage tank (305).

The flue gas generated in dual fuel burner (201) provides the thermal energy for the carbonization process in the reactor (200) once the flue gas has passed through the reactor (200) it is delivered to a heat recovery steam generator (307) and from there to a flue gas scrubbing system (308) before eventually being discharged to atmosphere (E).

High pressure steam generated in the heat recovery steam generator (307) is used to drive a steam turbine generator (309) and the electrical power generated is used to meet the power demand of the overall plant, including the plant's utility systems thus making the waste tyre recycling process independent for its energy demands. The carbon black and residual steel wire exit the reactor (200) at, at least, 400° C. and pass through a gravity feed cooling tube (401) which delivers the carbon black and residual steel wire to a cooling screw conveyor (SC-05) while being conveyed in (SC-05) the temperature of the carbon black residual steel wire is reduced to at least 100° C. At the outlet of (SC-05) the carbon black and residual steel wire is delivered to a vacuum sealing double damper (402) which monitors volume build up. When a define volume set point is reached the first damper valve opens and the carbon black with residual steel wire passes by gravity into the middle section of the vacuum sealing damper (402). As the first damper valve opens an inhibit is initiated which locks the second damper valve in the closed position, once the first damper valve closes the inhibit is lifted and the second damper valve opens allowing the carbon black and residual steel wire to fall into a hopper (403). The hopper (403) collects the carbon black and residual steel wire and on reaching a pre-set level and providing the second damper valve is closed, a third damper valve opens and the carbon black and residual steel wire are discharged via (404) on to a continually moving drag chain conveyor (C-06). The carbon black and residual steel wire are conveyed by (C-06) to a final cooling screw conveyor (SC-06) which cools the carbon black and residual steel wire from at least 90° C. to at least 30° C. After being discharged from (SC-06) the carbon black and residual steel wire are collected by an elevating bucket conveyor (BC-02) and delivered to a magnetic separator (405) where the residual steel wire is extracted and discharged to a collection skip for recycling. The carbon black passes through magnetic separator (405) to roll mill (406) where its size is reduced to predetermined maximum dimension. After passing through the roll mill (406) the carbon black is discharged to rotating sieve (407) to separate the carbon black into pre-determined particle sizes. After passing through the rotating sieve (407) the carbon black and any remaining steel wire are discharged to a final magnetic separator (408) to ensure any remaining residual steel wire is extracted. The carbon black is then discharged into a final bucket elevating conveyor (BC-03) which conveys the carbon black to a storage silo (409) used for filing carbon black transportation bags.

It should be understood that various changes, adaptations and modifications may be made thereto without departing from the gist of the invention and the scope of the claim. It should be understood; therefore, that the invention is not limited to details as illustrated and shown in the figures and that it may include variations as will be apparent to one skilled in the art.

The invention claimed is:

1. A pyrolysis process for decomposing rubber products, the process includes the steps of:
   a) shredding the rubber products;
   b) extracting first by-product including steel wire by at least one magnetic separator and discharging said first by-product for recycling;
   c) feeding said shredded products into a carbonizing vessel to decompose said rubber products;
   d) drawing out second by-product including oil vapor and third by-product including syngas from said carbonizing vessel into a quench vessel to reduce the temperature and further into a condenser where said second by-product including oil vapor which is cooled and condensed flows into a storage tank; cooled an un-condensable third by-product including syngas flows to a gas holder to be distributed as fuel for a fuel burner for said carbonizing vessel; and fourth by-product including flue gas exits the carbonizing vessel passing through a steam generator as an auxiliary burner to maintain generation of steam to drive a power generator that provides electrical power to the recycling process said fourth byproduct including flue gas further enters scrubbing system and discharged to the atmosphere thereafter;
   e) cooling fifth by-product including carbon black and residual first by-product including steel wire exiting from the carbonizing vessel (200) into a first cooling chamber to reduce temperature;
   f) extracting residual first by-product including steel wire by at least one magnetic separator and subsequently discharged for recycling; and
   g) discharging cooled fifth by-product including carbon black to a sieve for separating and grading into different particle sizes and further transferring said cooled fifth by-product including carbon black into a storage silo for packaging and shipment.

2. The process as claimed in claim 1, wherein the rubber products are used rubber products such as used rubber tyres or unused rubber products.

3. The process as claimed in claim 1, wherein said used rubber products are further shredded uniformly by a second reducing shredder to a size of at least 10 mm.

4. The process as claimed in claim 1, wherein said first by-product is extracted by vibrating magnetic separator and further extracted by a second magnetic separator to minimize the amount of said first by-product in said shredded rubber products.

5. The process as claimed in claim 1, wherein said carbonizing vessel requires thermal energy with temperature between 500° C. to 800° C. for decomposing process to be complete.

6. The process as claimed in claim 1, wherein said carbonizing vessel is sealed to achieve a controlled high temperature and whose operating pressure is maintained below atmospheric pressure and that said shredded products are continuously moved at controlled speed within said vessel enabling said products to be fed constantly.

7. The process as claimed in claim 1, wherein said carbonizing vessel operates in a partial vacuum where oxygen is below stoichiometric level to prevent combustion within said vessel.

8. The process as claimed in claim 1, wherein said by-products exiting said carbonizing vessel at least 400° C.; exiting said first cooling chamber at at least 90° C.; and exiting second cooling chamber at least 30° C. said second cooling chamber is placed between two magnetic separators.

9. The process as claimed in claim 1, wherein said fuel burner receives fuel from external fuel supply or from syngas and temperature of said burner can be modulated depending on the weight of said used rubber products in said carbonizing vessel.

* * * * *